(12) United States Patent
Polzin et al.

(10) Patent No.: US 8,447,457 B2
(45) Date of Patent: May 21, 2013

(54) METHOD FOR CONTROLLING THE AIR PRESSURE IN TIRES AS A FUNCTION OF A DRIVING SITUATION, AND DEVICE

(75) Inventors: Norbert Polzin, Zaberfeld (DE); Andreas Baier, Gernsbach (DE)

(73) Assignee: Robert Bosch GmbH, Stuttgart (DE)

( * ) Notice: Subject to any disclaimer, the term of this patent is extended or adjusted under 35 U.S.C. 154(b) by 565 days.

(21) Appl. No.: 12/605,883

(22) Filed: Oct. 26, 2009

(65) Prior Publication Data

US 2010/0114427 A1    May 6, 2010

(30) Foreign Application Priority Data

Oct. 29, 2008   (DE) .......................... 10 2008 043 260

(51) Int. Cl.
    *G06F 7/00*    (2006.01)
(52) U.S. Cl.
    USPC .......................................................... 701/29.1
(58) Field of Classification Search
    USPC .......................................................... 701/35
    See application file for complete search history.

(56) References Cited

U.S. PATENT DOCUMENTS

| 7,991,523 | B2 * | 8/2011 | Grieβer et al. ............... 701/33.8 |
| 2002/0157461 | A1 * | 10/2002 | Schmidt et al. ................. 73/146 |

FOREIGN PATENT DOCUMENTS

| DE | 103 03 492 | 10/2003 |
| JP | 6286435 | 10/1994 |
| WO | WO2005/072995 | * 8/2005 |

* cited by examiner

*Primary Examiner* — Thomas Tarcza
*Assistant Examiner* — Maceeh Anwari
(74) *Attorney, Agent, or Firm* — Kenyon & Kenyon LLP

(57) ABSTRACT

A method for controlling the air pressure in tires able to be mounted on two powered axles of a motor vehicle, as a function of a driving situation, an engine torque being distributable to the two axles by a distributor clutch, and a plurality of input values being converted in a processing unit into an air pressure value describing the air pressure in each tire, a clutch friction value, which represents the clutch status, being processed into a control value in the processing unit as well. Also, a device which includes means for implementing such a method.

17 Claims, 1 Drawing Sheet

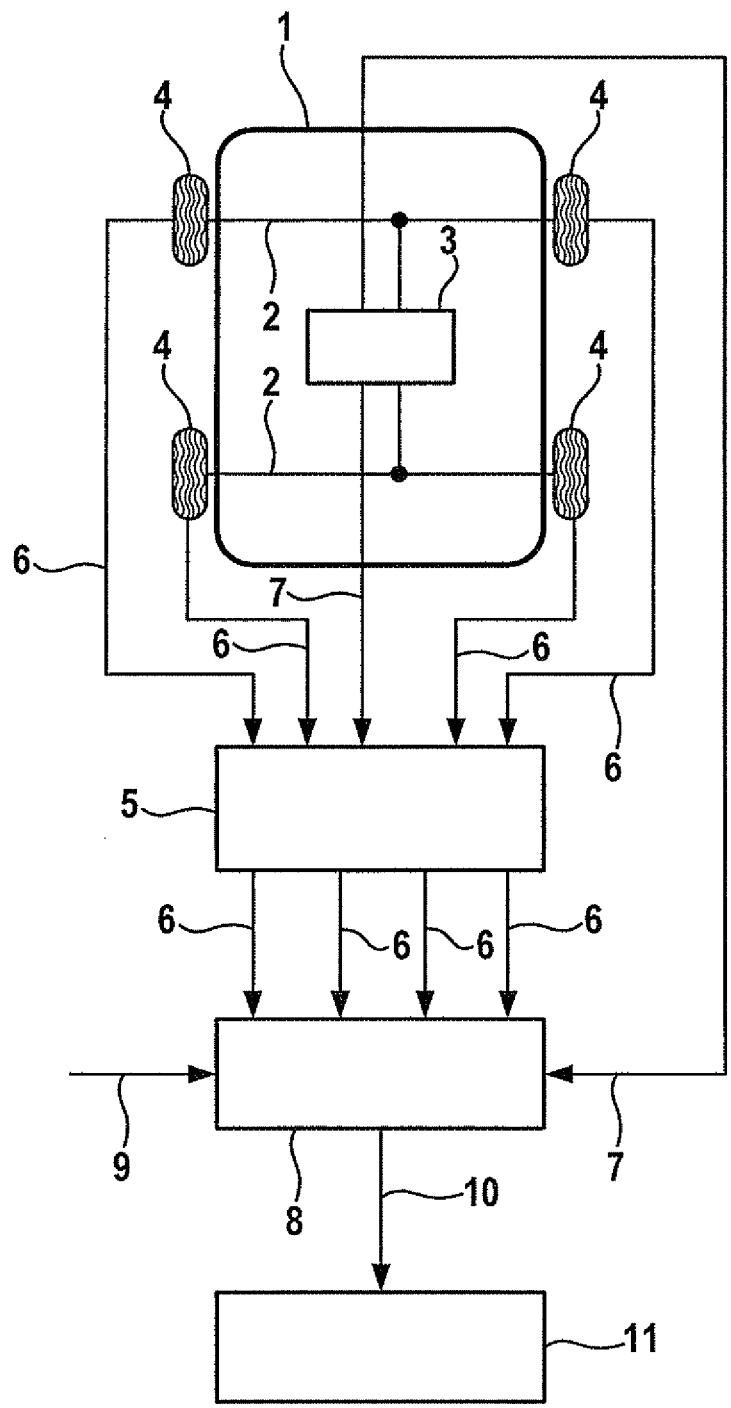

METHOD FOR CONTROLLING THE AIR PRESSURE IN TIRES AS A FUNCTION OF A DRIVING SITUATION, AND DEVICE

FIELD OF THE INVENTION

The present invention relates to a method for controlling the air pressure in tires able to be mounted on two driven axles of a motor vehicle, as a function of a driving situation, an engine torque being distributable to the two axles by a distributor clutch, and a plurality of input values being converted in a processing unit into an air-pressure value describing the air pressure in each tire.

BACKGROUND INFORMATION

From the related art, i.e., from German Patent No. DE 10303492, a system for monitoring the tire status is known.

The system described there discloses a method and a device for monitoring the tire status at driven wheels of a motor vehicle. Wheels are rolling devices that include elements which are able to be inflated using air, such as tires. In the standard case, the tires are made of caoutchouc or rubber and virtually impermeable to air. To monitor the air pressure, in German Patent No. DE 10303492, rotary motions of the driven wheels are recorded and the variables that are a function of the detected rotary motions are generated. In addition, the generated variables are interlinked. The monitoring then takes place as a function of the result of the logic operation. The drive torque acting on the driven wheels is also utilized in the monitoring.

In different types of tires the rolling circumference varies quite considerably as a function of the drive torque, so that a change in the rolling circumference caused by a loss in pressure is able to be compensated and is not detectable then.

German Patent No. DE 10303492 already provides a solution in this regard by taking the drive torques that are acting on the tires into account.

However, indirectly measuring tire-pressure control systems in the motor vehicle, i.e., a car or a truck, are presently not networked with other systems. Changes in the wheel circumference speed and/or changes in the natural frequency of the wheels or changes in the natural frequency spectrum of the wheel, whose measure of change is interpreted as a loss in tire pressure, are calculated with the aid of ABS wheel-speed numbers. Such a tire pressure loss is indicated to the driver when a setpoint/actual comparison of these variable quantities reaches a sufficiently large difference.

SUMMARY OF THE INVENTION

It is an objective to indicate a pressure loss to the driver in vehicles having tire pressure control, in order to thereby avoid critical driving states or thermal damage to the tire more rapidly and reliably.

In general, two physical operating principles are used, i.e., a rolling circumference detection on the one hand, and a calculation of the natural frequency of the wheels on the other.

In the rolling circumference detection, the occurring differences in the wheels' circumference speeds are integrated diagonally, sidewise or axlewise in a time interval. As soon as one of the differences exceeds a parameterizable threshold, a pressure loss is signaled as detected. However, only a pressure loss at one wheel and, under favorable conditions, at up to three wheels is able to be detected.

As an alternative or in addition, the natural frequency of the wheels is calculated. The occurring natural frequencies of the wheels and/or the natural frequency spectrums of the wheels are calculated in a wheel-specific manner, per axle or side, using suitable algorithms such as a Kalman filter, for instance. The use of a Kalman filter minimizes an average quadratic error. As soon as one of the differences exceeds a parameterizable threshold, a pressure loss will be detected once again. This algorithm is able to detect a loss in tire pressure individually for each wheel.

A combination of the rolling circumference detection and the calculation of the wheels' natural frequency already produces a robust system, which is able to be utilized for the detection of up to four tires from which air has escaped.

In the case of all-wheel vehicles having variable engine torque distribution to the powered axles, i.e., when used in drive trains having controllable distributor clutches, which thus are able to be activated or deactivated in separately post-connected distributor gears, the variable drive torque affects the slip conditions of the wheels. As a result, an occurring change in slip is no longer able to be assigned to a loss in tire pressure in an unambiguous manner. Moreover, a change in the wheel speed caused by a loss in tire pressure may lead to a redistribution of the engine torque to the driven axles, which is meant to compensate slip differences at an axle. The detection of tire pressure losses is therefore more difficult. This influence applies to a natural frequency shift of the wheels and the shift in the natural frequency spectrum of the wheels as well.

According to the present invention, a clutch friction value reflecting the clutch status is processed into a control value in the processing unit as well. The clutch friction value is preferably supplied by a clutch control device.

Using this further development according to the present invention, a reliable, robust and easily realizable tire pressure loss control is able to be presented even in the case of vehicles having variable torque distribution on the powered axles.

The present invention also relates to a device which includes means designed to implement the method according to the present invention.

For example, it is advantageous if a rolling value describing the rolling behavior of a tire is recorded at an initialization instant and preferably stored as a setpoint value in a memory. In an initialization of the system the rolling behavior of the wheels/tires and the natural frequency of the wheels or the frequency spectrum is detected at a nominal pressure and converted into calibration values. In this way values that are independent of the individual driving behavior but are comparable to detected values describing the driving situation may be utilized, the setpoint values being selected as reference values in a quasi stationary operation of the vehicle. In this context a "quasi stationary operation" is understood as the operation of the vehicle at a slow acceleration or deceleration, driving mostly straight-ahead, and without large differences in altitude.

Feedback to the vehicle driver is able to be induced in an efficient manner, in particular when the rolling value as setpoint value is subsequently compared with the control value, which was determined at a different instant and characterizes the rolling behavior of the tire exhibited at this particular time, and an action such as the actuation of an alarm signal output device is started if a limit value is exceeded or undershot. The limit value is specified in the sensing device in a vehicle-specific manner. An alarm signal output device includes any output unit operating acoustically, haptically and/or visually, such as loudspeakers or display devices.

In one further exemplary development it has shown to be advantageous if a wheel circumference speed value describing the wheel circumference speed, and/or a natural frequency value of the wheel describing the wheel's natural frequency is processed in the processing unit as well. This makes it possible to dispense with the use of sensors to be utilized in this regard in the region of the wheels/tires. Costs can thereby be saved.

The quality of the method is improved if in a quasi stationary operation of the motor vehicle the distributor clutch is set in such a way that the engine torque reaches only one axle and the rolling value is stored as a setpoint value at this time.

The adaptability to different situations may be increased if the memory is designed as an EEPROM. An EEPROM is an erasable, programmable read-only memory, i.e., an electrically erasable programmable read-only memory. This is a non-volatile, electronic memory component, which is used in computer technology, among others, where it is predominantly utilized in embedded systems. This memory may be part of a microcontroller/CPU.

The precision of the method is increased and faulty interpretations are prevented if the switching status of the distributor clutch is checked in a step following the setting of the clutch.

Furthermore, it is advantageous if for a defined interval such as 60 to 180 seconds, preferably 120 seconds, the clutch is set in such a way that the engine torque reaches only one axle and the rolling value is detected in this interval. This opening of the clutch may take place several times as a function of particular parameters, e.g., speed, load, slip, cross and/or lateral acceleration.

Another advantageous exemplary embodiment is characterized in that the input values are detected at the tires mounted diagonally on the vehicles, on one side of the vehicle or on one axle of the vehicle, the input values being processed into differential values and integrated across a specific time interval into the control values.

BRIEF DESCRIPTION OF THE DRAWING

FIG. 1 shows a flow chart of a method according to the present invention.

DETAILED DESCRIPTION

In principle, there are two defined states in an all-wheel drive system utilizing a distributor clutch, in which the assignment of a transmittable engine torque and a drive slip is unambiguous:
1. The distributor clutch is open: The vehicle transmits an entire engine torque to one of the two axles, while the other axle is rolling freely.
2. Torque increase at one previously freely rolling axle and detection of the slip degree.

In this case the torque distribution at the front and rear axle is able to be determined precisely.

For it is possible to read in the following signals via a corresponding algorithm:
1. The status of the clutch
2. The engine torque distribution between front axle and rear axle; however, the actually transmittable torque is also a function of the friction pairing of the tire and a road surface.

Two mechanisms are now able to act in the algorithm according to the present invention:
1. Superposed monitoring, which evaluates the tire/wheel behavior whenever the distributor clutch is open.
2. Superposed monitoring, which evaluates the tire/wheel behavior whenever the torque distribution at the tires/wheels is known.

FIG. 1 schematically shows a motor vehicle 1, which has two powered axles 2, an engine torque supplied by an internal combustion engine being distributed to the two axles 2 via a distributor clutch 3.

Mounted on axles 2 are two wheels in each case, on which air-filled tires 4 are mounted.

In a first step 5 an initialization takes place, i.e., the storing of rolling values 6 which describe the rolling behavior of the tires.

These values, which are defined as setpoints, are then processed further. In a comparison step 8, a clutch friction value 7, which optionally was also processed and stored in first step 5, is utilized, and the control value generated in the process is compared with a limit value 9. In the comparison step, a difference generation with a subsequent time-dependent integration is implemented as well.

If the limit value is exceeded or undershot, then an output value 10 will be generated, which causes the display of a warning message on a display 11.

What is claimed is:

1. A method for controlling air pressure in tires as a function of a driving situation, the tires being able to be mounted on two driven axles of a motor vehicle, an engine torque being distributable to the two axles by a distributor clutch, the method comprising:
    converting a plurality of input values into an air pressure value describing an air pressure in each tire in a processing unit; and
    processing a clutch friction value reflecting a clutch status into a control value in the processing unit;
wherein a rolling value describing a rolling behavior of a tire at an initialization instant is detected,
    wherein the rolling value is stored as a setpoint value in a memory,
    wherein the rolling value stored as the setpoint value is subsequently compared with the control value, which was determined at a different instant and characterizes the rolling behavior of the tire at the instant,
    wherein if a limit value is exceeded or undershot, an action is started, the action including an actuation of an alarm signal output device, and
    wherein the processing unit also processes at least one of (a) a wheel circumference speed value describing a wheel circumference speed and (b) a natural frequency value of a wheel describing a natural frequency of the wheel.

2. The method according to claim 1, further comprising:
    detecting a rolling value describing a rolling behavior of a tire at an initialization instant; and
    storing the rolling value as a setpoint value in a memory.

3. The method according to claim 2, further comprising:
    subsequently comparing the rolling value stored as the setpoint value with the control value, which was determined at a different instant and characterizes the rolling behavior of the tire at the instant; and
    if a limit value is exceeded or undershot, starting an action, including an actuation of an alarm signal output device.

4. The method according to claim 3, wherein the memory includes an EEPROM.

5. The method according to claim 2, wherein in a quasi-stationary operation of the motor vehicle, the distributor clutch is set in such a way that the engine torque reaches only one axle, and the rolling value is stored as the setpoint value at this instant.

6. The method according to claim 5, further comprising: checking a shifting status of the distributor clutch in a step following a setting of the clutch.

7. The method according to claim 2, wherein for a defined interval of 60 to 180 seconds, the distributor clutch is set in such a way that the engine torque reaches only one axle and the rolling value is detected in the defined interval.

8. The method according to claim 7, wherein the defined interval is 120 seconds.

9. The method according to claim 1, further comprising:
processing, also in the processing unit, at least one of (a) a wheel circumference speed value describing a wheel circumference speed and (b) a natural frequency value of a wheel describing a natural frequency of the wheel.

10. The method according to claim 1, wherein the input values are detected at the tires mounted on the motor vehicle diagonally, on one side of the motor vehicle, or at the tires mounted on an axle of the motor vehicle, the input values being processed into differential values and integrated into control values over a particular time interval.

11. A device for controlling air pressure in tires as a function of a driving situation, the tires being able to be mounted on two driven axles of a motor vehicle, an engine torque being distributable to the two axles by a distributor clutch, comprising:
a processing unit for converting a plurality of input values into an air pressure value describing an air pressure in each tire;
wherein the processing unit is configured to process a clutch friction value reflecting a clutch status into a control value,
wherein a rolling value describing a rolling behavior of a tire at an initialization instant is detected,
wherein the rolling value is stored as a setpoint value in a memory,
wherein the rolling value stored as the setpoint value is subsequently compared with the control value, which was determined at a different instant and characterizes the rolling behavior of the tire at the instant,
wherein if a limit value is exceeded or undershot, an action is started, the action including an actuation of an alarm signal output device, and
wherein the processing unit also processes at least one of (a) a wheel circumference speed value describing a wheel circumference speed and (b) a natural frequency value of a wheel describing a natural frequency of the wheel.

12. The device according to claim 11, wherein in a quasi-stationary operation of the motor vehicle, the distributor clutch is set in such a way that the engine torque reaches only one axle, and the rolling value is stored as the setpoint value at this instant.

13. The device according to claim 12, wherein a shifting status of the distributor clutch is checked following a setting of the clutch.

14. The device according to claim 11, wherein the memory includes an EEPROM.

15. The device according to claim 11, wherein for a defined interval of 60 to 180 seconds, the distributor clutch is set in such a way that the engine torque reaches only one axle and the rolling value is detected in the defined interval.

16. The device according to claim 15, wherein the defined interval is 120 seconds.

17. The device according to claim 11, wherein the input values are detected at the tires mounted on the motor vehicle diagonally, on one side of the motor vehicle, or at the tires mounted on an axle of the motor vehicle, the input values being processed into differential values and integrated into control values over a particular time interval.

\* \* \* \* \*